(12) United States Patent
Wieth et al.

(10) Patent No.: US 6,867,694 B2
(45) Date of Patent: Mar. 15, 2005

(54) METHOD AND SYSTEM FOR DETECTING AND REWARDING THE RETURN OF SHOPPING TROLLEYS

(75) Inventors: Franz Wieth, Pucheim (DE); Horst Sonnendorfer, Pucheim (DE)

(73) Assignee: Systec POS-Technology GmbH, Puchheim (DE)

( * ) Notice: Subject to any disclaimer, the term of this patent is extended or adjusted under 35 U.S.C. 154(b) by 0 days.

(21) Appl. No.: 10/019,143

(22) PCT Filed: Apr. 19, 2001

(86) PCT No.: PCT/EP01/04443

§ 371 (c)(1),
(2), (4) Date: Apr. 15, 2002

(87) PCT Pub. No.: WO01/82239

PCT Pub. Date: Nov. 1, 2001

(65) Prior Publication Data

US 2002/0121978 A1 Sep. 5, 2002

(30) Foreign Application Priority Data

Apr. 20, 2000 (DE) .......................................... 100 19 941

(51) Int. Cl.[7] .............................................. G08B 13/14
(52) U.S. Cl. ................................ 340/568.1; 340/568.5; 340/568.6; 340/572.1; 340/686.6
(58) Field of Search .......................... 340/568.1, 568.5, 340/568.6, 568.7, 568.8, 572.1, 572.4, 572.8, 426.14, 426.16, 686.6

(56) References Cited

U.S. PATENT DOCUMENTS

| 3,882,982 | A | * | 5/1975 | Smith | .......................... | 194/211 |
|---|---|---|---|---|---|---|
| 3,897,863 | A | * | 8/1975 | Peggs | .......................... | 194/212 |
| 4,470,495 | A | * | 9/1984 | Unger | .......................... | 194/205 |
| 4,868,544 | A | * | 9/1989 | Havens | .................... | 340/572.1 |
| 5,402,106 | A | * | 3/1995 | DiPaolo et al. | .......... | 340/572.1 |
| 5,848,399 | A | * | 12/1998 | Burke | .......................... | 705/27 |
| 6,486,768 | B1 | * | 11/2002 | French et al. | .............. | 340/5.92 |

FOREIGN PATENT DOCUMENTS

| DE | 69215842 | 1/1993 |
|---|---|---|
| DE | 69310758 | 4/1994 |
| DE | 19617205 | 11/1997 |
| DE | 29807344 | 8/1998 |
| DE | 19722609 | 12/1998 |
| EP | 0247632 | 12/1987 |
| EP | 0433751 | 6/1991 |
| EP | 0643372 | 3/1995 |
| EP | 0435225 | 3/1997 |
| WO | 9851197 | 11/1998 |

* cited by examiner

*Primary Examiner*—Jeffery Hofsass
*Assistant Examiner*—Daniel Previl
(74) *Attorney, Agent, or Firm*—Volpe and Koenig, P.C.

(57) ABSTRACT

A system for detecting and rewarding the return of shopping carts to collection points is provided. A signal corresponding to a dividend is generated as soon as a shopping cart is returned to a collection point. The signal is only generated when the shopping cart is returned correctly to a row of shopping carts. The correct return of the shopping carts is monitored by a digital image processing camera or with an optical signal transmitter which cooperates with evaluation units disposed on the shopping cart.

16 Claims, 2 Drawing Sheets

METHOD AND SYSTEM FOR DETECTING AND REWARDING THE RETURN OF SHOPPING TROLLEYS

BACKGROUND

This invention pertains to a method and a system to detect and reward the return of shopping carts to the collection points provided for them at the shopping centers as defined in the preamble of patent claim 1 and patent claim 12.

Self-service shopping centers and similar operations are generally interested in the customers using a shopping cart to go shopping. To this end, shopping carts are normally kept in collection points where the customer can take one with them to the shopping center. However, the customers are not typically motivated enough to bring the shopping cart that they have used back to the collection point after finishing their shopping. Instead, the shopping carts are often left where they had been unloaded—normally right in the middle of the parking lot of the shopping center. This results in additional costs for the shopping center since personnel must be on hand to gather the abandoned shopping carts. Also, there is always the danger of damage to parked cars due to abandoned shopping carts.

In order to provide an incentive to the customers for returning the used shopping carts to the collection point, a proven method has been to provide the shopping carts with lock boxes. This allows the customer to remove a shopping cart from the collection point only if he has inserted a refundable coin or the like into the lock box. This refundable coin is only then released back to the customer when the shopping cart is properly returned to the collection point. In addition to the anger that is not conducive to the customer's mood for shopping when he does not have any refundable coins available, the lock box system has been found to be an inordinate bother and an over-regulation depending on the type of customer.

To avoid this disadvantage to the lock box system, an electronic system to detect and reward the return of shopping carts has been proposed, for example in WO 98/1197, in which each shopping cart is provided with an electronic sender-receiver apparatus. With its help, the route of every shopping cart is reproduced and saved using detection means inside the shopping center, in particular at the cash register, and at the collection points. A central data processing apparatus recognizes if a shopping cart has passed through the cash register and has arrived at the collection point, and then sends a bonus in the form of a credit certificate or a participation certificate for a lottery. However, along with the clearly improved comfort for the customer in comparison to the widely used lock box system comes a detriment to the shopping cart return: the core of a lock box system consists usually of a lock box attached to the handle of every shopping cart with a hanging chain, with the chain having at its free end an actuating element for an adjacent lock box. This actuating element can be inserted only into an adjacent lock box, thus releasing the refundable coin deposited there if the two affected shopping carts are properly stacked into one another. An electronic return system such as that in WO 98/51197 can, however, not ensure necessarily that the shopping cart is not just haphazardly stored in the collection point but is properly put away there in a stacked row.

SUMMARY

Based on this prior art, the object of this invention is to provide an improved system of the type mentioned above to detect and reward the return of shopping carts to the collection points provided for them at supermarkets such that the advantages of the known lock box system are maintained.

This object is met by a system with the features of appended patent claim 1, as well as by a method with the features of the accompanying patent claim 12.

Advantageous embodiments of the system can be found in claims 2 through 11; preferred extensions of the method are noted in claims 13 through 16.

The system according to the invention involves at least a number of shopping carts, at least one collection point and detection means to generate a signal for the issuance of a bonus when the shopping cart is returned to the collection point, as well as detection means that recognize whether the returned shopping cart is pushed into the shopping cart just in front of it at the collection point within a prescribed tolerance, or is put away in a prescribed distance from the initial point of a stacked row of shopping carts. Only when the shopping cart is properly returned, i.e. is in general pushed into the stacked row, does the customer get a bonus.

In the process, it is not otherwise necessary that purchases had been made with the returned shopping cart: it can be desirable to award a customer a bonus if he "straightens up" shopping carts abandoned by other persons.

The detection means according to the invention can be formed from a digital image-processing camera, which is located preferably above the shopping carts stored in the collection point and programmed to recognize the handlebar of the shopping cart as well as its distance and/or its being parallel. Of course, other arrangements of the camera are conceivable, such as a lateral arrangement that allows perhaps specially marked lateral struts of the shopping carts to be recognized. A common CCD camera, properly programmed, can assume this task without any problem.

It is preferable to arrange this kind of camera such that it only detects shopping carts that are put away within the collection point. This then provides an incentive for the customers to evenly distribute the shopping carts to a number of collection points. This takes care of a weakness in the common lock box system: Overall it is seen that customers who park their vehicles at a parking place that is far from the shopping center take their shopping cart from a collection point that is close to the car, but do not return it there again after shopping; they use the collection point that is closest to the vehicle. This results in entire stacks of shopping carts having to be transferred from the remote collection point to the collection point next to the shopping center, and thus results in a necessary personnel expense.

If each of the shopping carts is provided with an individual identity (for example a bar code) identifiable using optical means, it can even be determined whether a certain shopping cart has been returned to the same collection point as that from which it was taken. The identification of this individual identity can also be done using the digital image-processing camera mentioned above, or using a type of laser scanner.

Another possibility of implementing the system according to the invention is to provide the collection point with an optical signal transmitter that preferably works in the infrared region. Associated evaluation units can be attached to each of the shopping carts; it is also possible, however, that the shopping cart only has an optical transponder—in the simplest case a mirror—and a common evaluation unit detects the reflected signal. In both cases, the recognition of proper insertion of the shopping cart into the stacked row can be done by providing each shopping cart with a deflection unit for the light signal coming from the signal transmitter, with the deflection unit directing the light signal from each shopping cart to the next respective shopping cart. The distance between two shopping carts can in this way be determined through optical means, which permits conclusions to be drawn as to whether the shopping carts have been properly put away, i.e. have been pushed into one another.

Another advantageous implementation of this embodiment of the system according to the invention is that the detection means include a number of evaluation units attached to the shopping cart that generate the signal to issue a bonus when a light signal from the signal transmitter is received from a shopping cart in front of it. These evaluation units are preferably provided with a read-write device, wherein the customer inserts a customer card into this read-write device when returning the shopping cart and the signal to issue a bonus is recorded onto the card. Alternatively, a wireless transmission of the signal from the evaluation unit to a customer-owned data medium is possible, which increases the operational comfort and improves upon the incidence of disruptions. At his next purchase, the customer is then credited this bonus when he presents the customer card. The big advantage of this embodiment is the intuitive utility and the controllability of the process by the customer—by recording a bonus in a central data processing system at the shopping center, the customer always has some mistrust as to whether he will actually get credited with the bonus.

The optical signal transmitter present according to an extension of the system according to the invention can be a laser, for instance; special advantages arise, however if a light signal is modulated according to the normal lighting system of the collection point. Separate installations with associated maintenance costs can then be avoided.

BRIEF DESCRIPTION OF THE DRAWINGS

A preferred embodiment of the invention is described in more detail and explained as follows with the help of the attached drawings. Shown are.

DETAILED DESCRIPTION OF THE PREFERRED EMBODIMENT

Figure 1:
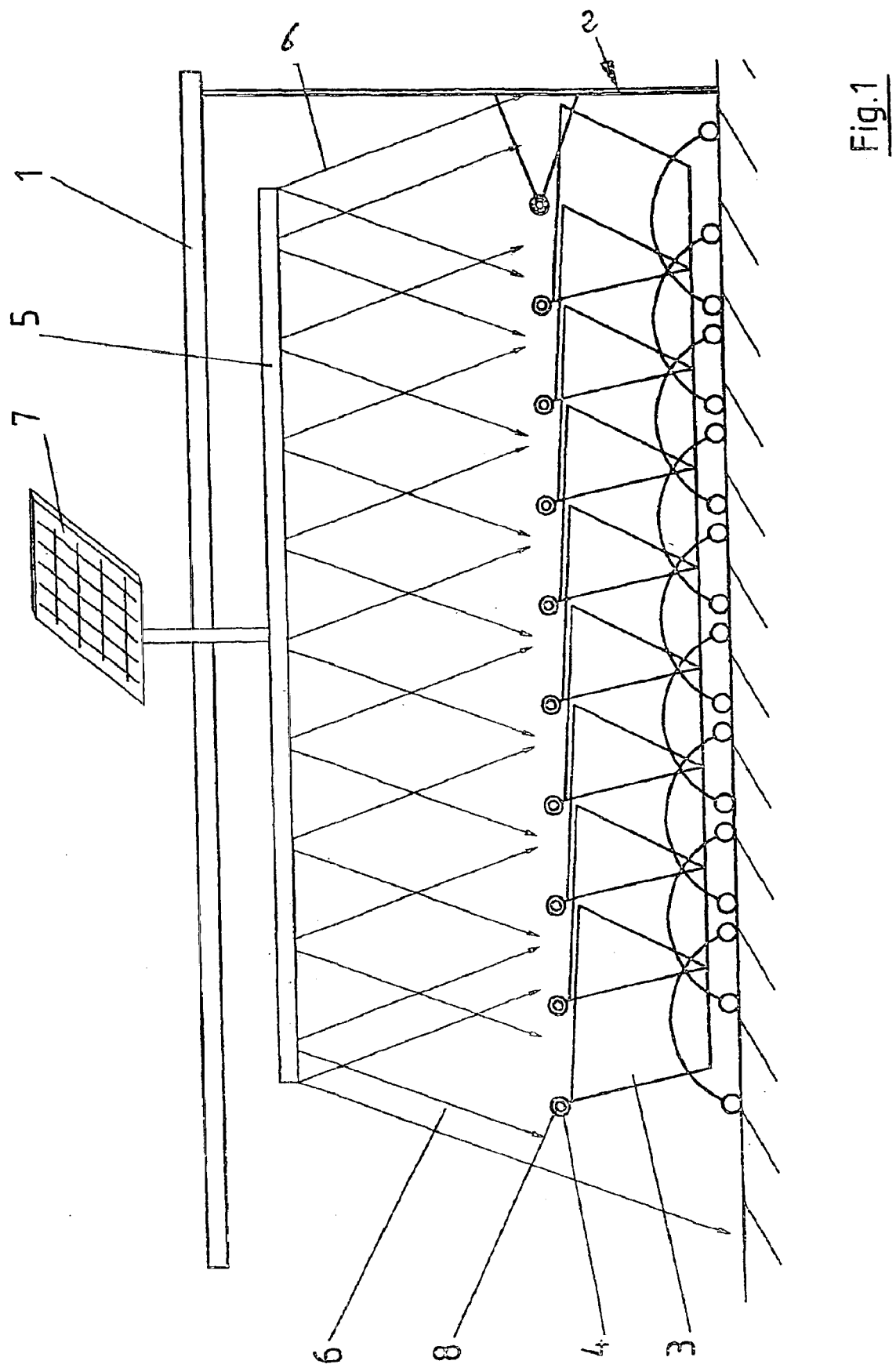
FIG. 1 is a schematic side view of a collection point with a shopping cart stacked row.

FIG. 1 shows schematically a collection point 1 located out in the open in front of the shopping center (not shown), in which a stacked row 2 of shopping carts 3 is kept. The collection point 1 is accessible to the customer from the left side as shown. The representation makes clear that the maintaining of the prescribed stacking interval of the individual shopping carts 3 in the stacked row 2 can be easily monitored using the handle 4 of the shopping cart 3 as a reference since they form a characteristic optical pattern.

An optical signal transmitter 5 located above the stacked row 2 sends light signals 6 at the stacked row 2 in order to enable the generation of the signal for the issuance of a bonus. At the open left side of the collection point 1 shown, it is clear that the radiating angles of the light signals 6 are selected such that the handle 4 of a shopping cart 3 that had not been completely pushed into the collection point 1 is no longer reached by the light signals 6. The signal to issue a bonus can thus only then be generated if the affected shopping cart 3 is put away completely within the collection point 1. Since the signal transmitter 5 needs a power supply, a solar module 7 is provided in this embodiment to provide power.

The shopping carts 3 of this embodiment are each provided with an electronic evaluation unit 8 at their handle 4 that intercepts, detects and forwards the light signals 6 to the next shopping cart 3 or to its evaluation unit 8. This is shown in FIG. 2.

Figure 2:
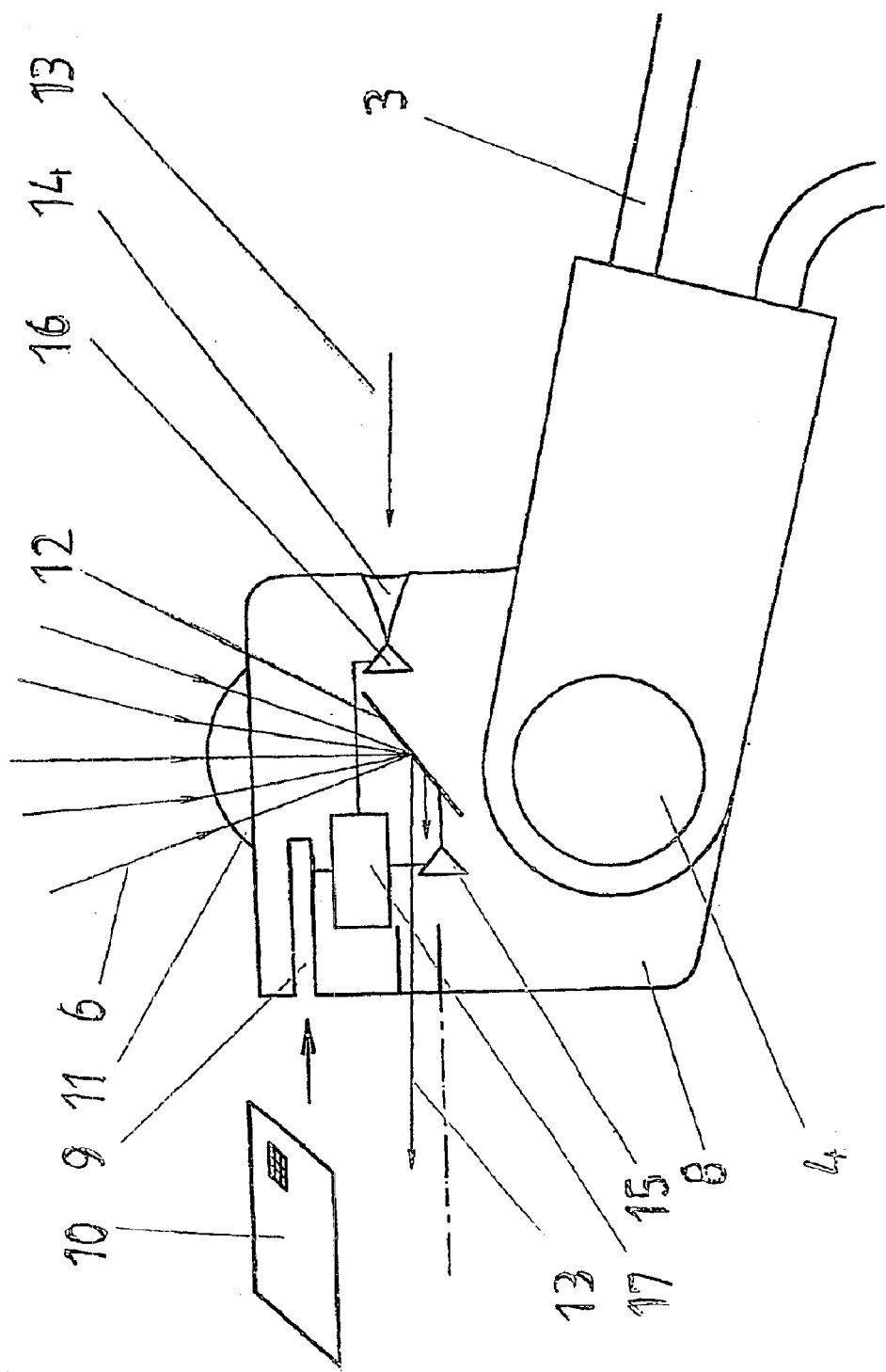
FIG. 2 is a schematic detailed representation of a shopping cart handle.

The evaluation unit 8 shown in more detail in FIG. 2, which is fastened to the handle 4 of a shopping cart 3, includes a read-write device 9 to receive a customer card 10 on which the signal to issue a bonus is stored. The customer must therefore insert his customer card 10 into the read-write device 9 of the evaluation unit 8 at least when returning the shopping cart 3 to the collection point 1. A first receiver 11, which is preferably provided with a converging lens, receives the light signals 6 of the signal transmitter 5 and diverts it using a mirror 12 as a redirected light signal 13 to the following receiver 8 of the shopping cart 3 directly after it. This subsequent evaluation unit is provided as the evaluation unit 8 with a second receiver 14 in front to receive the redirected light signal 13. A slight tilting of the redirected light signal 13 from horizontal ensures that the second receiver 14 can only receive the redirected light signal 13 when there is a prescribed distance between the two affected shopping carts 3. The evaluation unit 8 also contains a first photo diode 15 assigned to the first receiver 11 and a second photo diode 16 assigned to the second receiver 14, which forward each of the intercepted light signals as electrical signals to an evaluation circuit 17. The evaluation circuit 17 produces a relationship between the two electrical signals provided by the photo diodes 15 and 16 and writes the signal to issue a bonus to the electronic storage medium located on the customer card 10.

Of course, it is also possible to redirect the light signal 6 not from the respective shopping cart 3 in front to the respective next shopping cart 3, but to perform the redirection in the reverse manner of evaluation unit 8 from the next shopping cart 3, to reflect the light signal 13 that is redirected forward at the shopping cart 3 in front of it and then to detect at the following shopping cart 3 so as to generate the signal to issue a bonus.

Reference List

1 Collection Point
2 Stacked Row
3 Shopping Cart
4 Handle (of 3)
5 Signal Transmitter
6 Light Signal
7 Solar Module
8 Evaluation Unit
9 Read-Write Device
10 Customer Card
11 Receiver (first)
12 Mirror
13 Redirected Light Signal
14 Receiver (second)
15 Photo Diode (first)
16 Photo Diode (second)
17 Evaluation Circuit

What is claimed is:

1. A system to detect and reward the return of shopping carts to collection points at a shopping center, comprising: at least one collection point (1) for receiving and storing shopping carts and a detection means (5, 6, 8, 10) to generate a signal for issuance of a bonus when a shopping cart (3) is returned to the at least one collection point (1), the detection means (5, 6, 8, 10) determines whether the returned shopping cart (3) has been stored in a stacked row of shopping carts (2) within a prescribed tolerance by determining if a handlebar of the shopping cart is within the prescribed tolerance to a handlebar of a next adjacent shopping cart.

2. A system according to claim 1, wherein the detection means include a digital image-processing camera located above the stacked row (2) of shopping carts stored in the at least one collection point (1) and is programmed to recognize the handlebar of the shopping cart (3) as well as a distance and/or a parallel positioning to the handlebar of the next adjacent shopping cart.

3. A system according to claim 2, wherein the camera is located so that it only detects the shopping carts (3) that are put away inside of the at least one collection point (1).

4. A system according to claim 1, wherein said shopping cart (3) is provided with an optically determinable individual identification.

5. A system according to claim 1, wherein the at least one collection point (1) is provided with an optical signal transmitter (5) at operates in an IR range.

6. A system according to claim 5, wherein the shopping carts (3) are provided with deflection units (11, 12) to deflect a light signal (6) from the signal transmitter (5) directing the light signal (6) from one shopping cart (3) to a next immediate shopping cart (3) in the stacked row of shopping carts (2).

7. A system according to claim 5, wherein the detection means include evaluation units (8) attached to the shopping carts (3) which generate a signal to issue a bonus upon receiving a light signal (13) that was received and redirected by the shopping cart (3) in front of them in the stacked row of shopping carts (2).

8. A system according to claim 7, wherein the evaluation units (8) are designed such that they convey the signal (13) to issue the bonus to a customer-held data medium.

9. A system according to claim 8, wherein the evaluation units (8) are provided with a read-write device (9) with which the signal (13) to issue the bonus can be stored on a customer card (10).

10. A system according to claim 5, characterized in that the optical signal transmitter (5) is made up of a common lighting system with a modulated light signal (6).

11. A method to detect and reward the return of shopping carts to collection points at a shopping center, comprising: generating a signal upon the return of a shopping cart to a collection point to issue a bonus, wherein the bonus is issued only if the returned shopping cart is stored in a shopping cart stacked row in the collection point within a prescribed tolerance by determining if a handlebar of the shopping cart is within the prescribed tolerance to handlebar of next adjacent shopping cart.

12. A method according to claim 11, further comprising using a digital image-processing camera to generate the signal to issue a bonus.

13. A method according to claim 11, further comprising attaching an optically recognizable individualized identification to the shopping carts.

14. A method according to claim 11, further comprising initiating the generation of the signal to issue the bonus using an optical signal at the collection point.

15. A method according to claim 14, further comprising modulating the optical signal according to a common lighting system at the collection point.

16. A method according to claim 11, wherein the signal to issue a bonus is stored on a data medium of the customer.

* * * * *